Figure 1:
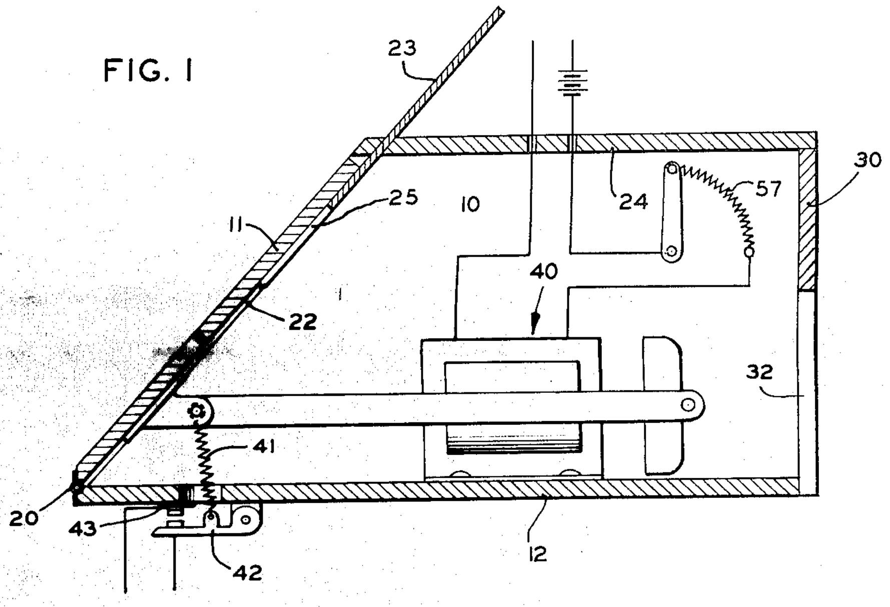
Figure 2:
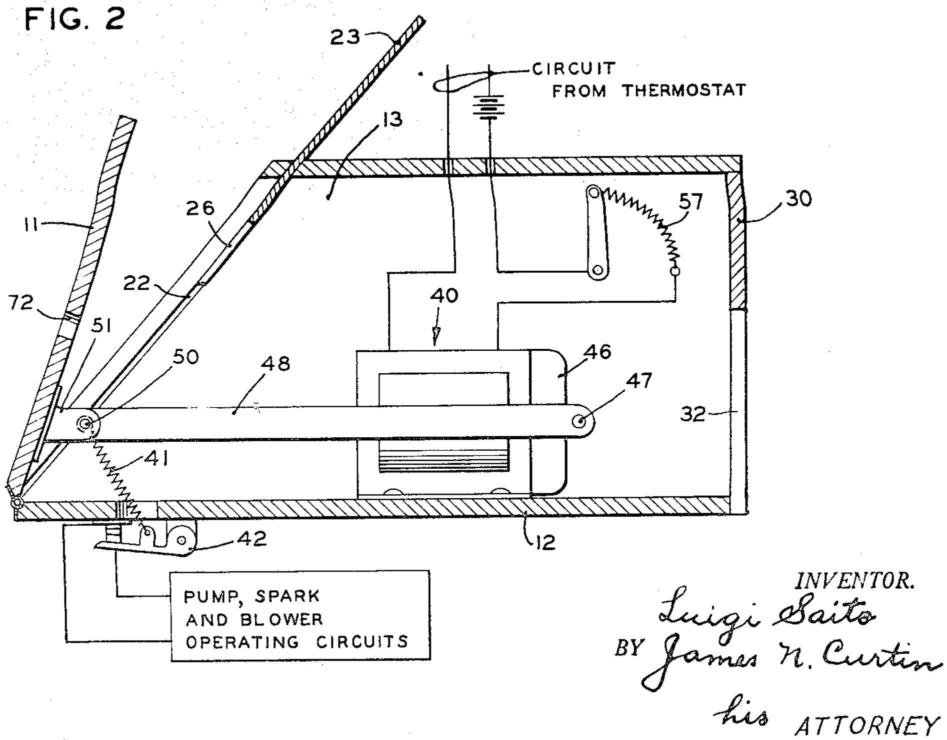
Figures 1, 2:
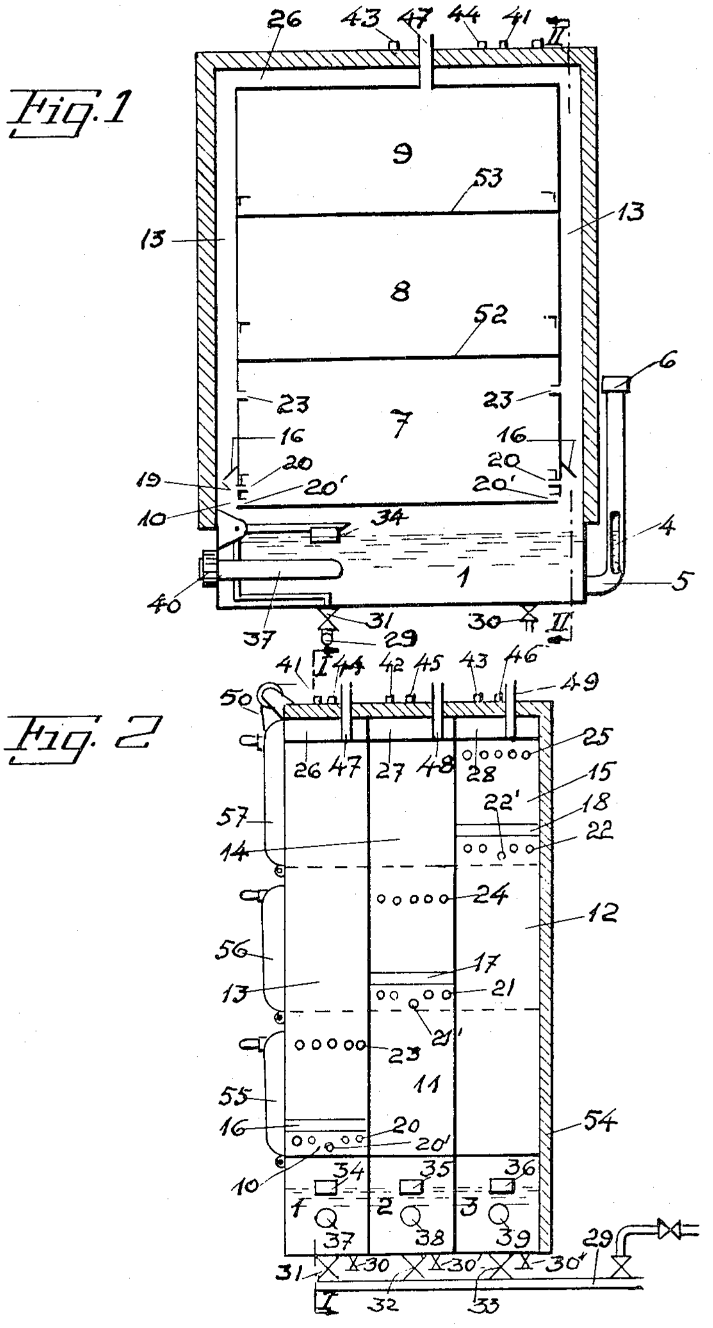

June 19, 1956 L. SAITO 2,750,936

ADJUSTABLE DAMPER FOR FUEL SAVING DEVICES

Filed June 17, 1953

INVENTOR.
Luigi Saito
BY James N. Curtin
his ATTORNEY

June 19, 1956 V. V. SJÖLUND 2,750,937

STEAM COOKING APPARATUS

Filed Feb. 19, 1952

INVENTOR

VÄINÖ VALDEMAR SJÖLUND

BY Maxwell E. Sparrow

ATTORNEY